(12) United States Patent
Auer

(10) Patent No.: US 10,404,357 B2
(45) Date of Patent: Sep. 3, 2019

(54) COMMUNICATION SATELLITE FOR A SATELLITE CONSTELLATION

(71) Applicant: Tesat-Spacecom GmbH & Co. KG, Backnang (DE)

(72) Inventor: Erich Auer, Besigheim (DE)

(73) Assignee: Tesat-Spacecom GmbH & Co. KG (DE)

( * ) Notice: Subject to any disclaimer, the term of this patent is extended or adjusted under 35 U.S.C. 154(b) by 3 days.

(21) Appl. No.: 15/804,230

(22) Filed: Nov. 6, 2017

(65) Prior Publication Data

US 2018/0138968 A1    May 17, 2018

(30) Foreign Application Priority Data

Nov. 15, 2016  (DE) .......................... 10 2016 121 919

(51) Int. Cl.
*H04B 7/185*    (2006.01)
*H01Q 1/24*    (2006.01)
(Continued)

(52) U.S. Cl.
CPC ..... *H04B 7/18521* (2013.01); *H04B 7/18513* (2013.01); *H04B 7/18515* (2013.01);
(Continued)

(58) Field of Classification Search
CPC ............ H04B 7/18521; H04B 7/18513; H04B 7/18515; H01Q 3/02; H01Q 1/288; H01Q 1/247
See application file for complete search history.

(56) References Cited

U.S. PATENT DOCUMENTS 5,410,728 A    4/1995   Bertiger et al.
5,586,165 A *  12/1996  Wiedeman ......... H04B 7/18556
                                                455/13.1
(Continued)

FOREIGN PATENT DOCUMENTS

CN          103546211 A  *  1/2014
DE    10 2013 217 564 A1     3/2015
(Continued)

OTHER PUBLICATIONS

Harald Keller, Horst Salzwedel, Link Strategy for the Mobile Satellite System Iridium, IEEE Proceedings of Vehicular Technology Conference—VTC, 1996, pp. 1220-1224 (Year: 1996).*
(Continued)

*Primary Examiner* — Shailendra Kumar
(74) *Attorney, Agent, or Firm* — Lerner, David, Littenberg, Krumholz & Mentlik, LLP

(57) ABSTRACT

A communication satellite for use in a satellite constellation is provided. The communication satellite includes: a user side interface for wireless receiving and transmitting of data; a network side interface for wireless receiving and transmitting of data; a first inter satellite interface for wireless receiving and transmitting of data having a first radiation direction of electromagnetic waves; a second inter satellite interface for wireless receiving and transmitting of data having a second radiation direction of electromagnetic waves. The first radiation direction has a first radiation angle with respect to a direction of movement of the communication satellite. The second radiation direction has a second radiation angle with respect to the direction of movement of the communication satellite. An absolute value of the first radiation angle corresponds to an absolute value of the second radiation angle.

17 Claims, 8 Drawing Sheets

(51) Int. Cl.
*H01Q 1/28* (2006.01)
*H01Q 3/02* (2006.01)

(52) U.S. Cl.
CPC ............ *H01Q 1/247* (2013.01); *H01Q 1/288* (2013.01); *H01Q 3/02* (2013.01)

(56) References Cited

U.S. PATENT DOCUMENTS

| | | | | |
|---|---|---|---|---|
| 6,157,621 | A * | 12/2000 | Brown | ............... H01Q 1/242 370/310 |
| 6,512,920 | B1 * | 1/2003 | Yaoya | ............... H04B 7/18541 455/428 |
| 9,847,829 | B2 | 12/2017 | Tronc et al. | |
| 2006/0189275 | A1 * | 8/2006 | Karabinis | .......... H04B 7/18521 455/12.1 |
| 2014/0105100 | A1 | 4/2014 | Tronc et al. | |
| 2015/0280810 | A1 * | 10/2015 | Beals | ............... H04B 7/1851 455/13.1 |
| 2016/0037434 | A1 * | 2/2016 | Gopal | ............... H04W 40/246 370/316 |
| 2016/0094288 | A1 * | 3/2016 | Krebs | ............... H04B 7/18521 455/12.1 |
| 2017/0070939 | A1 * | 3/2017 | Chong | ............... H04W 36/36 |
| 2017/0215190 | A1 * | 7/2017 | Chung | ............. H04W 72/0453 |
| 2017/0324465 | A1 * | 11/2017 | Sotom | ............... H04B 7/18513 |

FOREIGN PATENT DOCUMENTS

| | | |
|---|---|---|
| WO | 9620112 A1 | 7/1996 |
| WO | 2012171809 A1 | 12/2012 |

OTHER PUBLICATIONS

H. Keller, H Salzwedel: Link Strategy for the mobile satellite system Iridium. In: IEEE 46th Vehicular Technology Conference, 1996, S. 1220-1224.

* cited by examiner

COMMUNICATION SATELLITE FOR A SATELLITE CONSTELLATION

FIELD OF THE INVENTION

The disclosure generally relates to the technical field of data and signal transmission. In particular, the disclosure relates to a communications satellite for use in a satellite constellation as well as to a satellite constellation comprising a multitude of such communication satellites.

BACKGROUND OF THE INVENTION

Typically, communication satellites are used as element or part of a communication link and entirely or partially replace a terrestrial communication network. In the present case, a communication link is understood as comprising those components that are arranged between two communicating devices and serve the purpose of transmitting data between these devices. Also, communication satellites may serve to connect user devices with access points (may also be referred to as transition point) to a terrestrial communication network, so that the user devices are connected to the communication network.

Advantageously, communication satellites may be used to connect user devices located in infrastructurally less developed regions of the earth or regions not developed at all to a communication network. This may be the case if terrestrial access points to the communication network completely lack or cannot be provided at all, e.g., in sparsely populated areas of the earth or on wide water areas.

Communication satellites comprise at least two interfaces. Signals from a user device are received via an interface on the user side or are sent to the user device via this interface, and signals are sent to the communication network or are received therefrom via an interface on the network side. In general, satellites have the advantage that they circle the earth and, hence, may connect almost any point of the surface of the earth to a communication network. However, also such a satellite requires a remote station that is connected to the terrestrial communication network.

BRIEF SUMMARY OF THE INVENTION

There may be a need to improve the availability of connecting a user device to a terrestrial communication network.

According to a first aspect, a communication satellite for being used in a satellite constellation is provided. The communication satellite comprises: a user side interface for wireless receiving and transmitting of data; a network side interface for wireless receiving and transmitting of data; a first inter satellite interface for wireless receiving and transmitting of data having a first radiation direction of electromagnetic waves; a second inter satellite interface for wireless receiving and transmitting of data having a second radiation direction of electromagnetic waves. The first radiation direction has a first radiation angle with respect to a direction of movement (movement direction) of the communication satellite. The second radiation direction has a second radiation angle with respect to the direction of movement of the communication satellite. An absolute value of the first radiation angle corresponds to an absolute value of the second radiation angle.

The communication satellite may particularly be used to provide a communication infrastructure. It is particularly suitable to provide communication links (connections) in regions of the earth in which an infrastructural development with land lines is not possible or only possible with difficulties or does not happen due to other reasons, for example due to economic considerations.

In the present case, the term satellite constellation is used such that it corresponds to an entirety of communication satellites (the so-called constellation satellites), at least to the entirety of the satellites in one orbital plane.

The user side interface is in connection with the users or user devices. A user device may be an end device, but also a network node that bundles the communication links of multiple user devices and transmits it to the user side interface of the communication satellite. Preferably, the user side interface as well as all remaining communication interfaces are configured to transmit signals in a wireless manner and by electromagnetic waves. For example, the electromagnetic waves may be optical signals or radio signals.

The network side interface is the connection to the access node into the terrestrial communication network (e.g. the Internet). The access nodes may be referred to as gateways and are stationary remote stations on the surface of the earth. The communication satellite establishes a connection between the user devices and the access nodes.

Basically, a data transmission is provided or intended from the user side interface to the network side interface or vice versa. Thus, the communication satellite replaces a possibly required landline or another communication link between a user device and a data or communication network.

The first and second inter satellite interfaces may also be referred to as inter satellite links (ISL). The ISLs may establish connections to a predeceasing satellite and/or to a successor satellite in an orbital track of the satellite constellation. The ISLs are adjusted such that their radiation direction corresponds to a fixedly given or predetermined radiation angle in order to be able to establish a connection to the predecessor and to the successor satellite. Especially the design that the radiation angle of both radiation directions have the same amount with respect to the direction of movement (flight path or trajectory or also a tangent to the substantially circular trajectory at the current position of the communication satellite) enables using a satellite constellation in which multiple satellites circle the earth in the same circular orbital plane and under the condition that the distances between the satellites in the same orbital track are equally sized or substantially equally sized. As the distances between each satellite and its predecessor as well as its successor satellite are equal, the radiation angles of both radiation directions that are of an equal amount enable that each satellite may establish a connection via the ISLs to the predecessor satellite and/or to the successor satellite at any time and at any point of the orbital track.

According to an alternative example and in case of an ellipsoidal orbital track of the communication satellites around the earth, the radiation angles of the ISLs may be variable in a limited angular range merely in one dimension, namely in the orbital plane of the orbital track. This means that the radiation angles are not fixedly predetermined in this example and may be varied during operation of the satellites. In particular, the radiation angles may be varied such that the first radiation angle is greater or smaller than the second radiation angle. Each of the first and second inter satellite interfaces may be suspended with reference to the satellite such that they can carry out a rotational movement about an axis (axis of rotation) or about a point. Appropriate drive units may be provided for this purpose. In this example, the first and second inter satellite interfaces carry out a rotational movement with one degree of freedom and are not movable apart from that. The rotational movement of the inter satellite interfaces takes place such that a relative change in position of two immediately adjacent or neighboring satellites in the same orbital track can be compensated, i.e., that at least one inter satellite interface can follow the immediately neighboring satellite if the immediately neighboring satellite changes its relative position with respect to the current satellite due to the ellipsoidal orbital track. Preferably, both inter satellite interfaces are pivotable in the same direction or the same plane, that is the inter satellite interfaces have only one rotatory degree of freedom and the axes of rotation of both inter satellite interfaces are parallel.

Each one of the user side interface, the network side interface, as well as the first and second inter satellite interfaces may be referred to as communication interface. These communication interfaces are preferably configured for bidirectional data transmission and may comprise a sending path and a receiving path.

It is noted that in the context of this description, the terms "communication satellite" and "satellite" are used in an analog manner, i.e., particularly a reference to a satellite always and especially also includes a communication satellite.

The ISLs enable an advantageous use in a satellite constellation as they enable any connection between a satellite and its direct predecessor satellite and successor satellite and also enable transparent routing. The term transparent routing is to be understood as redirecting a data stream between the satellites in the same orbital track in a demand-oriented manner in order to establish a connection to a remote station in a manner that is transparent to the user devices.

The orbital track of a satellite is defined by its shape (ellipsoidal or circular), the radius or the average flight attitude above the average surface of the earth, and the inclination angle (angle of the orbital track with respect to the equator).

In case a satellite changes its orientation in space and in the orbital track, for example due to a swivel or tilt movement about the center of the satellite, the inter satellite interfaces may, according to an example, execute a compensation movement in order to maintain a constant radiation angle with reference to the orbital track.

According to an embodiment, the first inter satellite interface is arranged such that the first radiation angle is fixedly given (preset) with respect to the communication satellite and is unchangeable during operation of the communication satellite.

Given that a multitude of communication satellites is arranged in an orbital track at the same distance with respect to one another and that the multitude of communication satellites move with the same velocity along the same path (i.e. orbit), the amount of the first radiation angle directly depends on the number of the communication satellites in an orbital track. The distances between the communication satellites do not change or do not substantially change, so that the radiation angle may already be set during manufacturing of the communication satellites. Change of the radiation angle during operation is not necessary in case of a circular orbital track, so that a complex tracking (adaptation) of the radiation angle can be likewise omitted. In other words, no relative movement between the communication satellites of an orbital track occurs in case of a circular orbital track, so that it is even not required to change the radiation angle.

According to a further embodiment, the communication satellite is configured to detect presence of a remote station for the network side interface and, in case such a remote station lacks, to put the first inter satellite interface and/or the second inter satellite interface in an active state, so that an outgoing communication connection or communication link to a predecessor satellite and/or a successor satellite can be established.

This embodiment describes the procedure in case of a missing or defective remote station and how the communication satellite works in such a scenario. In other words, the communication satellite establishes an outgoing communication link to a neighboring satellite, in particular to a directly neighboring satellite in the same orbital track. For this purpose, an identification number (ID) may be assigned to each communication satellite in the satellite constellation and each communication satellite may be configured such that the IDs of the neighboring communication satellites are known. As a rule, each communication satellite must know its own ID and two additional IDs, namely that of the predecessor satellite and that of the successor satellite. The ISLs may be activated in a demand-oriented manner, they are not needed if a satellite has a remote station on the earth's surface for the network side interface.

According to a further embodiment, the communication satellite is configured to, in case of a missing remote station for the network side interface, transmit the data provided for a sending path of the network side interface via the first inter satellite interface or the second inter satellite interface that is in the active state.

In case the remote station is missing, the data are sent to a directly neighboring communication satellite via the active ISL. The active ISL takes over the function of the network side interface.

Thereby it is enabled that a connection to a terrestrial communication network is provided with the help of the communication satellites also in regions of the earth where a terrestrial communication infrastructure is missing.

According to a further embodiment, the communication satellite is configured to receive, via a receiving path of at least one of the inter satellite interfaces, an incoming request for establishing a communication link to a predecessor satellite or successor satellite, and to establish a communication link to the predecessor satellite or successor satellite, in particular to the predecessor satellite or successor satellite directly neighboring on the orbital track.

This embodiment upgrades the extent of functions so that the communication satellite can output its outgoing data via an ISL not just in case of missing remote stations on the surface of the earth, but also in case a neighboring satellite has no remote station on the surface of the earth, that neighboring satellite can transmit its outgoing data via an ISL to the current communication satellite. Hence, the communication satellite receives incoming communication links.

According to a further embodiment, the communication satellite is configured to output data that are received via the communication link of an inter satellite interface either via the network side interface or via the other inter satellite interface.

This embodiment describes how data that are received via an ISL are processed and, in particular, via which output interface (outbound interface) these data are output. If the communication satellite has a connection (link) to a remote station on the surface of the earth then the data received via the ISL are output via this connection, otherwise these data are forwarded via the second ISL to the next satellite. The latter is referred to as transparent routing.

According to a further embodiment, the communication satellite is configured to convert frequency bands of the communication link so that signals of an incoming communication link (for example a communication link incoming via an ISL) do not interfere with signals of an outgoing communication link of the communication satellite.

This embodiment describes assignment of resources in a communication satellite. In the present case, the frequency, the time, or a used code are understood as resources. Assignment of resources is of relevance (only) for incoming communication links. In case a satellite outputs via one of its ISLs merely data, this is done by using the frequencies assigned to it. In order to avoid interferences and superpositions on the sending path (be it to a remote station on the surface of the earth or via the other ISL to another satellite), the satellite which receives data from a neighboring satellite via an ISL must practice assignment of resources at its outbound interface or in a signal processing path which is upstream with respect to the outbound interface.

The assignment of resources is elucidated in the following exemplarily with respect to the used frequencies. However, these elucidations apply in a similar manner also to other resources, e.g., time or codes or coding methods. The communication satellites in a satellite constellation may be assigned multiple frequency bands in which they transmit data via the user side interface. The user side interface may comprise multiple radiating and receiving arrangements (e.g., antennas) each of which is being assigned its own radiation direction. In the following, the radiating and receiving arrangement is referred to as radiating arrangement, wherein it is noted that this term does not exclude a bidirectional transmission (sending and receiving). In the radiating arrangements, the frequency bands are assigned such that neighboring radiating arrangements use different frequency bands. As different satellites may be assigned the same frequency bands due to the satellites being spaced apart from each other and without resulting in superpositions in the normal mode of operation (each communication satellite has at least one communication link to a remote station on the surface of the earth), superpositions may, however, arise if one satellite forwards its outgoing data to a neighboring satellite via an ISL. In order to prevent these superpositions, a conversion of frequency (frequency translation) of the communication link that comes in via an ISL takes place. The frequency translation may take place such that the communication satellite to which the additional communication link is established via an ISL uses for its own data (that is those data which the current communication satellite receives at the user side interface and has to process) only part of the frequency bands assigned to it and used the other frequency bands for the communication link coming in via the ISL. This assignment or translation may take place dynamically depending on the demand for bandwidth, wherein specific scenarios may be prepared during fabrication or initial configuration of the communication satellite so that merely the corresponding configuration must be read out and applied.

For assignment of the resources required for transmission, all access methods can be applied, that is for example FDMA (frequency division multiple access), TDMA (time division multiple access), or CDMA (code division multiple access), or a combination thereof, in order to separate the transmission ranges of two satellites from each other and to prevent superpositions. What is elucidated above with reference to frequency bands may be applied in a similar manner also to time domains separated from each other or different coding methods.

According to a further embodiment, the user side interface comprises a multitude of radiating and receiving arrangements, wherein a communication cell on the surface of the earth is assignable to each radiating and receiving arrangement.

In the present case, the term of the user side interface is used that it includes the entirety of the communication arrangements which serve the data transmission from or to a user side. For example, this may be a multitude of antennas, each of which is adjusted such that it covers a region of the surface of the earth of given size. Two antennas may be adjusted such that they cover regions of the surface of the earth that are adjacent to each other, wherein the antennas that cover adjacent regions use different resources (e.g., frequency bands) in order to avoid superpositions and interferences. For example, a communication satellite may use four different frequency bands. Hence, a cell compound may be mapped to the surface of the earth in which it is possible that no cell has an adjacent cell using the same frequency bands.

Provided that sufficient communication satellites exist, the entire surface of the earth may be provided with cells so that from any place on earth a communication link may be established with the communication satellite by a user device. For example, communication satellites in multiple orbital tracks may be provided for such a cell system that covers the entire surface of the earth, wherein in each orbital track multiple communication satellites orbit the earth at the same distance or angular distance. The ISLs described herein serve establishing a connection between the communication satellites on the same orbital track. It is provided that a communication satellite can establish a connection via the ISLs merely to its direct predecessor satellite and/or to its direct successor satellite. Hence, a radiation direction of the inter satellite interfaces can be fixedly given if the distances of the satellites on an orbital track do not or substantially not vary, i.e., if the satellites do not or substantially not execute a relative movement as, for example, on a circular orbital track.

For example, n orbital tracks, each with m satellites, may be provided, which results in a total number of n×m satellites. The number of satellites per orbital track as well as the number of orbital tracks may be selected such that a majority or the entire surface of the earth is covered. Hence, ships on the open sea or isolated islands or user devices in regions that are infrastructurally not developed or badly developed may be connected to a communication network by such a satellite constellation.

According to a further embodiment, the radiating and receiving arrangement of the user side interface are designed structurally and/or functionally identical.

By the design of the communication satellite described herein it is enabled that the sending and receiving paths of the user side interface are designed structurally and/or functionally identical and particularly differ only by the used resources (frequencies, time slots, codes). Hence, the design of the communication satellite enables a high grade of modularization, namely preferably along the signal path of an interface. Each signal path may be an individual module, wherein each signal path may be a sending and a receiving path. This type of modularization enables a simple design of the communication satellite as well as an economic use of the components in large scale, that is for a satellite constellation comprising a multitude of satellites.

The radiating arrangement contains in a sending path those components which are responsible for preparation of a signal to be transmitted up to handover to the wireless transmission interface. Conversely, the receiving arrangement on the receiving path contains those components which receive the signal received and prepared at the wireless receiving arrangement and which provide it for further processing. The radiating arrangement as well as the transmission arrangement may particularly comprise the following components: at least one signal filter, at least one amplifier, a separator to forward the received signal to a desired component (e.g., for internal processing or to the user side interface or also to one of the ISLs) or to select a component from which to receive the transmitted signal (e.g., from the user side interface or from one of the ISLs).

In the present case, a module or the term of modularization are to be understood as follows: a module contains functions and/or building blocks as well as use of these functions and/or building blocks, and enables fabrication of exchangeable units (modules) which are exchangeable because they are functionally and/or structurally identical, wherein these modular units may possibly be adaptable by specifying configuration parameters without their function and/or structure being changed.

The design of the communication satellite supports in an advantageous manner the usage of modularized, i.e., similar, components.

According to a further embodiment, the network side interface comprises a first radiating and receiving arrangement and a second radiating and receiving arrangement, each of which is configured to be directed to a stationary remote station on the surface of the earth.

In particular, the communication satellites described herein may be used in a low earth orbit, LEO, in an average distance from 400 km up to 1.400 km from the average surface of the earth. For example, in LEO, satellites move with a velocity of circulation which completes an orbit of the earth in about 90 minutes.

To avoid interrupting the connection at the network side interface resulting from the high orbit velocity of the satellites, two radiating and receiving arrangements are provided, of which one radiating and receiving arrangement may establish and maintain a connection with the stationary remote station that is next in direction of movement of the satellite, while the other radiating and receiving arrangement maintains a current connection to the present remote station. In other words, a connection to the next remote station is established prior to the connection to the present remote station breaks down. These two connections may also be used at the same time for transmitting data, so that the effectively available bandwidth is increased.

This connection to the remote stations enables it to the user devices which are connected to the user side interface to transmit or receive data via the network side interface and the stationary remote stations to or from a communication network.

According to a further embodiment, a radiation angle of the first radiating and receiving arrangement of the network side interface is changeable during operation time of the communication satellite.

Especially in regions that are infrastructurally not developed or badly developed, the density of stationary remote stations which enable access to a communication network is very low. This low density of stationary remote stations may be utilized in a more efficient manner if the radiating and receiving arrangement (also: antenna) of the network side interface can be adjusted to a stationary remote station and remains directed to said remote station at least for a limited duration or for a limited distance although and during the satellite moves in orbital track.

As opposed to the user side interface which covers a region of the surface of the earth (and the totality of all satellites may cover the entire or a majority of the surface of the earth), the network side antenna is reliant on being adjusted or directed to one of the few stationary remote stations. Just due to the movement of the communication satellite it is required to adjust these antennas, i.e., to adapt the antennas to the current position of a satellite with reference to the stationary remote stations.

According to a further embodiment, the communication satellite is configured to use differently polarized signals at the network side interface as well as at the first inter satellite interface and the second inter satellite interface.

Thereby, the effectively available bandwidth may be increased, e.g., doubled. The signals may be polarized linearly or circularly. By polarizing, the number of sending and receiving paths (i.e., of the components required therefor) in the interfaces may double.

Alternatively or additionally to using signals polarized in a different manner, of course also the number of further resources, e.g., of the frequency bands, may be increased, as far as this is possible and admissible, in order to provide a required bandwidth to be available.

According to a further embodiment, the first and second radiating and receiving arrangements of the network side interface as well as radiating and receiving arrangements of the first and second inter satellite interfaces are designed structurally and/or functionally identical.

In case a satellite establishes an (outgoing) ISL connection to another satellite it may be enabled thereby that the other satellite behaves functionally like a remote station on the surface of the earth or can be accessed like such a remote station. Of course, this also applies to the opposite case of an incoming ISL connection.

The design enables aligning the functions of the individual interfaces and a simplified structural design of the communication satellite in its entirety.

However, apart from the structural identity, other resources, e.g. frequencies, are used in an ISL connection on an ISL interface for the sending and receiving path compared to the other ISL interface. This has the simple reason that, from the perspective of the other ISL interface, an ISL interface acts functionally like the stationary remote station on the surface of the earth, so that receiving takes place in that frequency band in which the other satellite sends, and vice versa.

The frequency bands of the inter satellite interfaces and of the network side interfaces may be identical and, hence, may be used commonly as radiation directions of the inter satellite interfaces and of the network side interfaces are always sufficiently angularly decoupled as to definitely avoid mutual interferences. In total, this reduces the number of the used frequency bands, which is a relevant aspect especially when being used in satellites.

According to a further aspect, a satellite constellation in an orbit is provided, the satellite constellation comprising a multitude of communication satellites as described herein, wherein a first group of communication satellites is arranged in a first orbital track in an equal angular distance with respect to each other and wherein a second group of communication satellites is arranged in a second orbital track in an equal angular distance with respect to each other.

In particular, the orbit may be an orbit close to the earth at an average height of 400 km up to 1.400 km above the average surface of the earth.

The second orbital track is arranged with respect to the first orbital track at an angle unequal to 0° and unequal to 180° and so that the satellites of both orbital tracks do not cross each other. I.e., the first orbital track differs from the second orbital track to the effect that the communication satellites of the second orbital track cover or fly over other regions of the surface of the earth than the satellites of the first orbital track, wherein the orbital tracks may intersect at two points, e.g., above the poles of the earth. The two orbital tracks may have slightly different heights above ground (surface of the earth), so that the satellites do not influence each other at the intersection points.

Of course, the satellite constellation may also comprise more than two groups of communication satellites.

Each group of communication satellites is arranged so that the corresponding orbital track is preferably a closed circle or ellipse which the satellites continuously run along. The circle or the ellipse may be referred to as orbital plane. With reference to a center point of the orbital track (this may correspond to the center point of the earth), an opening angle between two neighboring satellites of an orbital track, respectively (i.e., arranged on the same orbital track directly one after another, so that no other satellite of the same orbital track is in between) is identical or almost identical. In other words, the distance between each two neighboring satellites of an orbital track is same size.

According to an embodiment, each communication satellite of the multitude of communication satellites is configured to establish a communication link via its inter satellite interfaces exclusively to the directly neighboring communication satellites in the same orbital track.

Conversely, this does of course not mean that the communication satellites cannot establish communication links via the user side interface and the network side interface. It merely relates to the aspect that apart from the directly neighboring satellites of the same orbital track no other satellites can be connected via the inter satellite interfaces.

In case of a circular orbital track, the adjusting or orientation of the antennas of the inter satellite interface can be fixedly done.

However, in case of an ellipsoidal orbital track, the adjusting or orientation of the antennas of the inter satellite interface can be adjusted in a limited angular range merely in one dimension, namely in the orbital plane.

In the following, characteristics of the communication satellites as well as advantages resulting therefrom, and characteristics of the satellite constellation shall be summed up.

Due to the high number of communication satellites in an entire satellite constellation, one requirement may be that the satellites have a starting mass as low as possible as to be able to start as much satellites as possible per rocket. Likewise, it may be required that the manufacturing costs per satellite are lowest possible in order to minimize investment costs per space segment, and that a data capacity per satellite is provided as high as possible in order to have a guaranteed data capacity per user device or user as high as possible (e.g. 50 Mbps). An interrupt-free handover of the communication link of a user device from satellite to satellite during flyover is of advantage, as well as a high availability of the services (e.g., as a result of redundant satellites).

The design of the communication satellites and of the satellite constellation enables to minimize the number of ground stations as well as to adapt to different user densities in different service area or coverage area. Likewise, it is enabled to bridge over missing "landing points" for ground stations by the satellite constellation, e.g. in case of huge water areas like the Pacific or Atlantic Ocean or huge desert regions like the Sahara, (by transparent routing), in order to enable an economic global service or coverage. Likewise, a high availability of the services is enabled even in case of failure of ground stations (flexible routing via space segment).

The communication satellites described herein provide the opportunity of a modular upgrade for realizing inter satellite links (ISLs) between constellation satellites, preferably on the same orbital track. For realizing ISLs between constellation satellites, identical TRX-units are applicable for the ISL to the successor satellite and for the gateway links (connection to the stationary remote station on ground). The sending and receiving frequencies are to be mirrored for the ISL to the predecessor satellite. I.e., the module building set upgraded in this manner also covers extension with ISLs. ISLs between satellites of an orbital track enable transparent routing and forwarding, TRF, of user device data over multiple satellites before these data are fed to the ground station via a gateway link and then into the terrestrial network.

The proposed TRF is compatible with any access methods (frequency division multiple access (FDMA), time division multiple access (TDMA) and code division multiple access (CDMA)) and hybrid forms thereof. Applying TRF merely requires that free frequency bands, time slots or codes as well as a suitable controlling and synchronization (frequency, time, code) is provided at the involved gateway link and ISLs.

For an angular distance a between two neighboring satellites on the same orbital plane, the antennas of the ISLs to the predecessor and successor satellites may be fixedly mounted at a radiation angle $\beta=\alpha/2$ (down tilt angle, inward inclination in a direction towards the surface of the earth with respect to the circular orbital track).

The alignment of the fixedly mounted ISL antennas is fixedly coupled with the orthogonal alignment of the antennas (user link spot beam) of the user side interface towards the surface of the earth and, hence, requires no additional calibrating or adjusting mechanisms and no additional control and monitoring effort.

It is possible to also use the frequency bands of the gateway links for the ISLs as both links are always decoupled spatially (spatial angle $90°-\alpha/2$).

Using the same frequency bands for all ISLs is possible as the ISLs from one satellite to the next one are decoupled with the spatial angle of $\alpha$, respectively. By a suitable design of the ISL antenna it may be ensured that their directivity is sufficient to suppress an interfering unit under the spatial angle $\alpha$.

According to an example, ISLs may be provided from one satellite to the next but one satellite in the same orbital track. With the spatial angle $2\alpha$ and at the previous antenna design, respectively, the ISLs to the next but one satellite are securely spatially decoupled from the ISLs to the directly neighboring satellite. According to a further example, ISLs may be established to the directly neighboring satellite as well as to the next but one satellite.

An interference of the ISLs with other satellites exterior to the constellation (GEO or LEO at other heights), which satellites use the same frequency bands, may be excluded by decoupling due to a sufficiently large spatial angle in connection with a sufficiently large distance.

The additional hardware expenses for TRF amounts to the same number of TRX units that are required for the gateway links, as well as additionally two fixedly mounted antennas.

TRF enables reducing the density of the ground stations for a satellite constellation. Thus, the network coverage increases globally although the infrastructural effort on ground is reduced.

TRF enables bridging of so-called dead zones, i.e., of large ocean and desert regions where no ground stations can be provided. Thus, TRF enables substantially increasing global coverage that a satellite constellation can achieve. Especially in the start and roll out phase of the space and ground segments of a satellite constellation, TRF enables an advantageous and flexible architecture that minimizes early investments (ground segment) and maximizes early revenues (coverage).

If, in the use phase, the workload of the satellite constellation increases in specific regions (hot spots) up to the capacity limit on the user side of the individual constellation satellites, TRF may be waived or abandoned at these hot spots by upgrading or extending the ground segment. This scenario also provides a flexible network architecture.

An advantageous design of the usable bandwidths of the gateway links as well as of the ISLs with respect to the sum of the bandwidths of all user links is to design the first ones at least factor 2 higher. In case of full workload up to the capacity limit at the user side of the individual constellation satellites, TRF may then still be used due to the higher usable bandwidths of the gateway links and the ISLs. Even in case of full workload up to the capacity limit, this enables to work with a lower density of ground stations due to usage of TRF.

In case two polarization planes (horizontal and vertical or left and right circular) are used for the gateway links and the ISLs, but not for the user links, the previously indicated advantageous factor 2 is realized thereby without an additional need of frequency bands. Still, basis for the implementation is the extended module building set.

TRF enables providing redundancy paths in case of failures of ground stations and, hence, increases the reliability of the whole system (ground and space segment). TRF likewise enables providing redundancy paths for gateway TRX failures on satellites and, hence, increases the reliability of the whole system (ground and space segment).

BRIEF DESCRIPTION OF THE DRAWINGS

In the following, exemplary embodiments are described in more detail with reference to the attached drawings. The drawings are schematic and not to scale. Same reference signs refer to same or similar elements. It is shown in.

DETAILED DESCRIPTION

Figure 1:
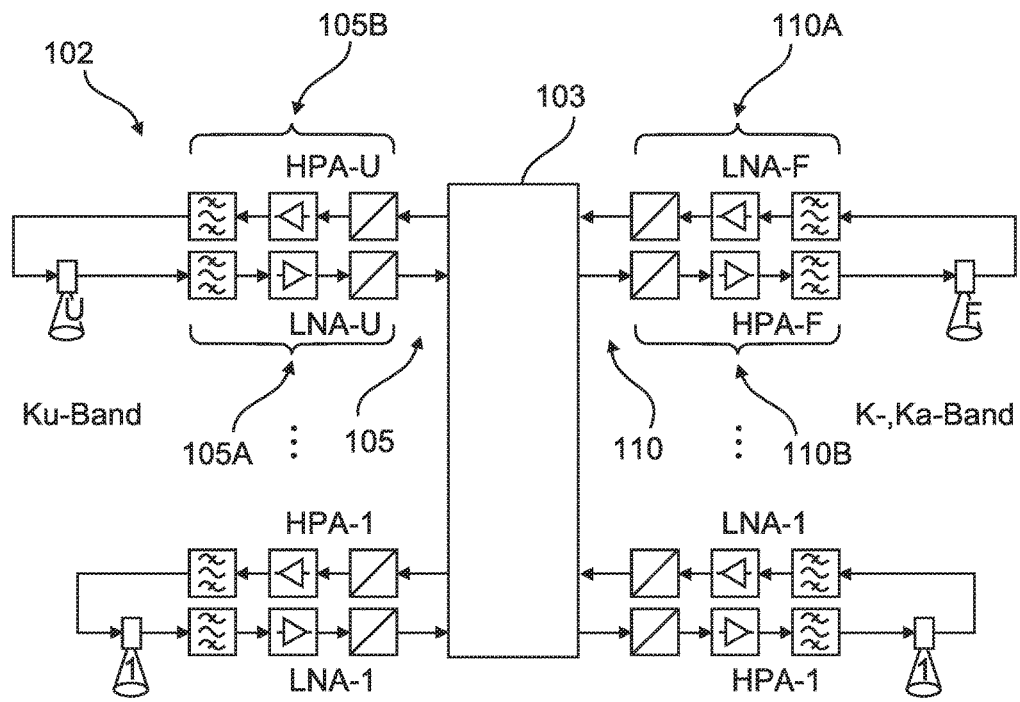
FIG. 1 a schematic representation of a communication system for a communication satellite.

FIG. 1 shows a communication system 102 of a communication satellite. In the present disclosure, those systems of a communication satellite that are provided and configured for receiving and sending data are understood as being a communication system 102. If in the following reference is made to a communication satellite, reference is especially also made to the communication system 102.

The communication system 102 comprises a user side interface 105. The user side interface may comprise multiple radiating and receiving arrangements, each of which comprises at least one receiving path 105A and one sending path 105B. The sending path as well as the receiving path may comprise the common components required therefor, for example amplifier, filter, crossover networks (diplexer, dividing networks), etc.

Furthermore, the communication system 102 comprises a network side interface 110. The network side interface 110 may likewise comprise multiple radiating and receiving arrangements, each of which comprises one receiving path 110A and one sending path 110B. Here, the same explanations apply as presented with regard to the sending path and receiving path of the user side interface.

Each of the user side interface 105 and the network side interface 110 may be configured to transmit signals in a wireless manner to a user or to any type of remote station. For this purpose, specific frequency ranges may be provided, e.g., at the user side interface 105 frequencies of the Ku-band and at the network side interface 110 frequencies of the K-band or Ka-band, for example.

In particular, the communication system 102 is configured to receive data at the user side interface 105 and to output those data at the network side interface 110, or vice versa. As to output the received data at the intended interface, a switch circuit 103 is provided that connects the corresponding receiving paths and sending paths.

Figure 2:
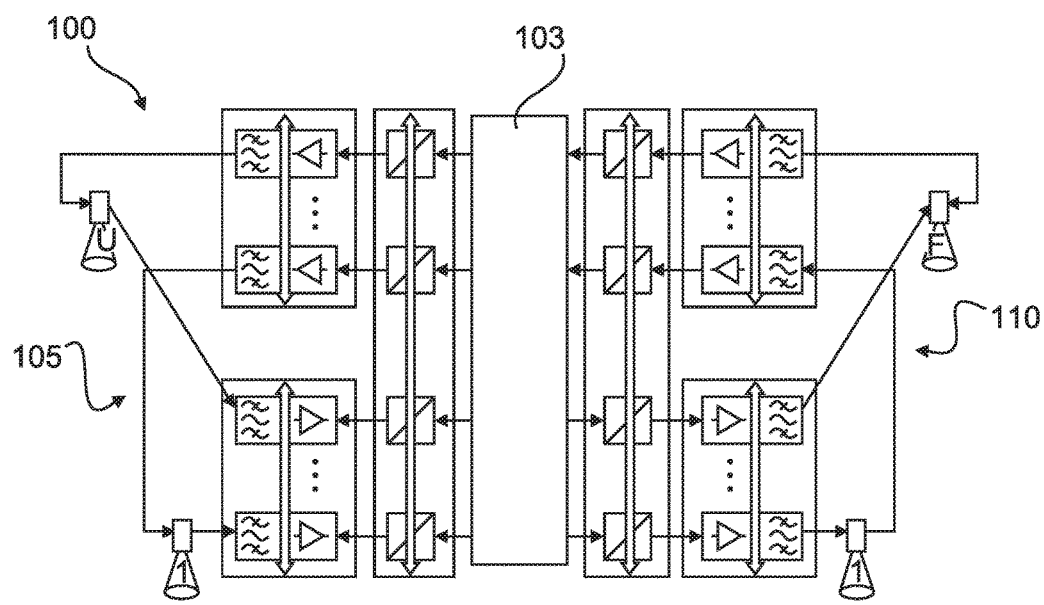
FIG. 2 a schematic representation of a communication system for a communication satellite.

FIG. 2 shows a schematic representation of a communication system for a communication satellite 100. For details of this representation, reference is made to FIG. 1. However, in FIG. 2 it is schematically shown how components of the communication system 102 may be modularized. In this representation, modularization takes place on the basis of similar functions. This means that components having similar functions are provided as modules and are basically exchangeable. This type of modularization may also be referred to as vertical modularization.

Figure 3:
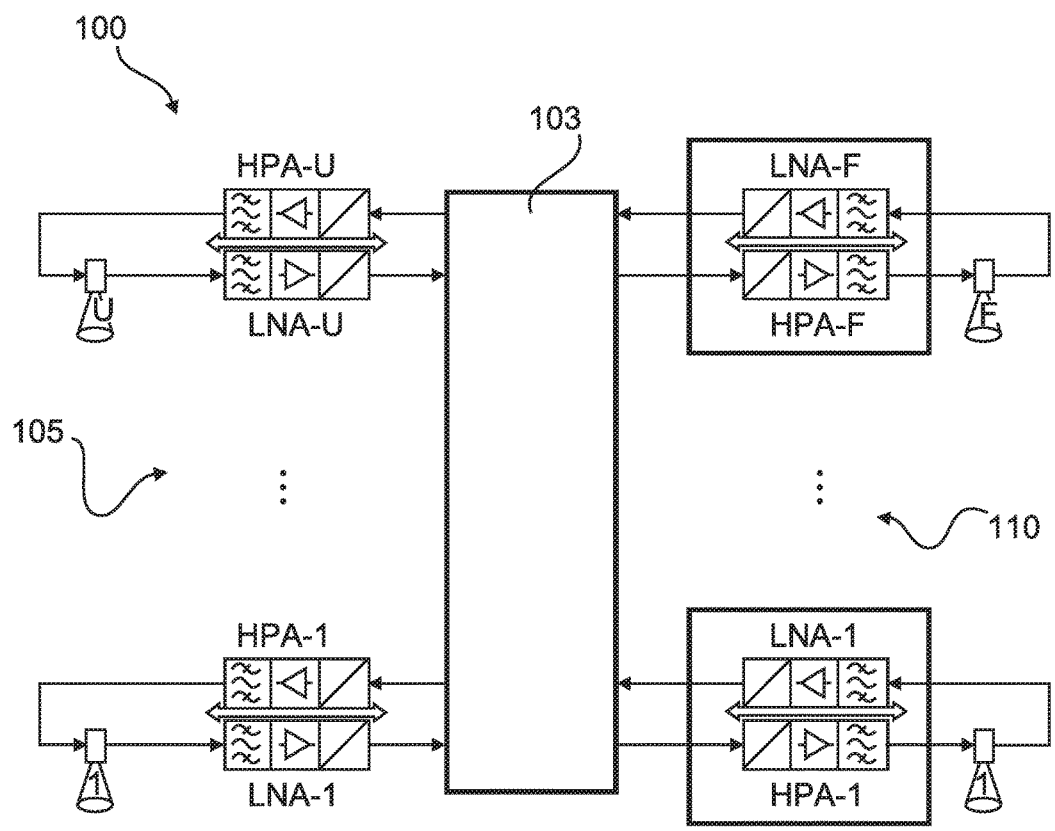
FIG. 3 a schematic representation of a communication system for a communication satellite.

FIG. 3 shows similar to FIG. 2 an opportunity to modularize components of a communication system. However, in contrast to FIG. 2 a modularization is shown in FIG. 3 along a signal path. That is, at least a part of the signal path, i.e., for example of the receiving path and/or the sending path, is provided as a module. This type of modularization may also be referred to as horizontal modularization and it provides the advantages described above.

Figure 4:
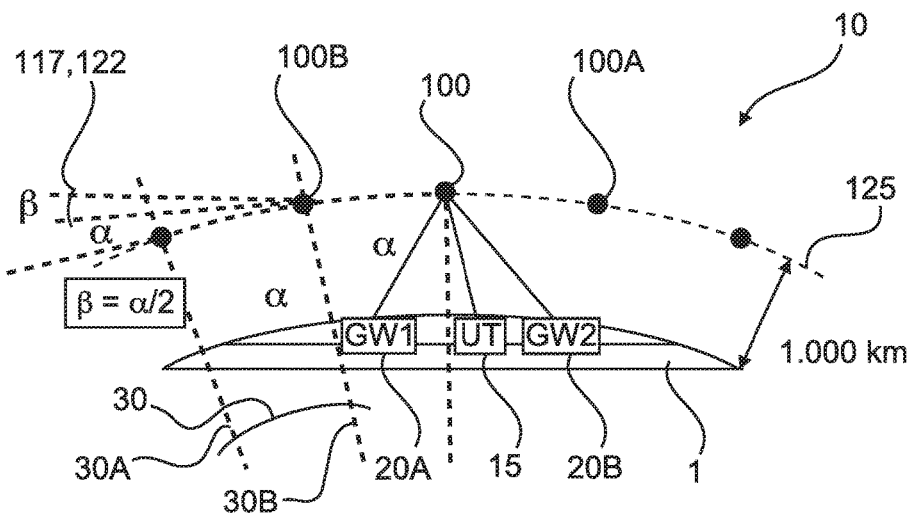
FIG. 4 a schematic representation of a satellite constellation according to an exemplary embodiment.

FIG. 4 schematically shows a satellite constellation 10 as well as a part of the earth 1. A multitude of communication satellites 100 orbit or circle the earth in the same orbital track 125. The communication satellites 100 in the same orbital track 125 are preferably arranged at the same angular distance 30 with respect to each other and move at the same angular and/or path velocity around the earth, so that the angular distance 30 is maintained even during movement of the communication satellites around the earth.

The angular distance 30 between two neighboring or consecutive communication satellites is determined as the angle that is spanned between two imaginary connection lines 30A, 30B from the respective communication satellite to the center of the earth.

In the low earth orbit, the orbital track 125 may run at a distance between 400 km and 1.400 km from the surface of the earth, e.g., at 1.000 km above the surface of the earth.

From the perspective of the communication satellite 100, there exists a direct predecessor satellite 100A and a direct successor satellite 100B, respectively, in the same orbit. As already described, each communication satellite 100 may establish communication links via the inter satellite interface only to the direct predecessor satellite or to the direct successor satellite.

It may also be retrieved from FIG. 4 that each communication satellite 100 may establish communication links to a user device 15 (via the user side interface) and to at least one, preferably two, remote stations 20A, 20B (via one radiating and receiving arrangement of the network side interface, respectively), so that the user device 15 may transmit data to the remote stations via the communication satellite and/or receive data therefrom.

If the orbital track is circular, a radiation angle 117 of the inter satellite interface may be fixedly determined and sustained as the angular distance between two consecutive communication satellites is equal.

With reference to the communication satellite 100B, the radiation angle 117 may be described for the communication satellite 100 and its inter satellite interface as the angle between a tangent to the orbital track at the position of the communication satellite 100 and an imaginary connection between the communication satellites 100 and 100B. This angle 117 is indicated with the symbol β, wherein this angle is half of the angular distance 30 between two neighboring communication satellites on the same orbital track.

Figure 5:
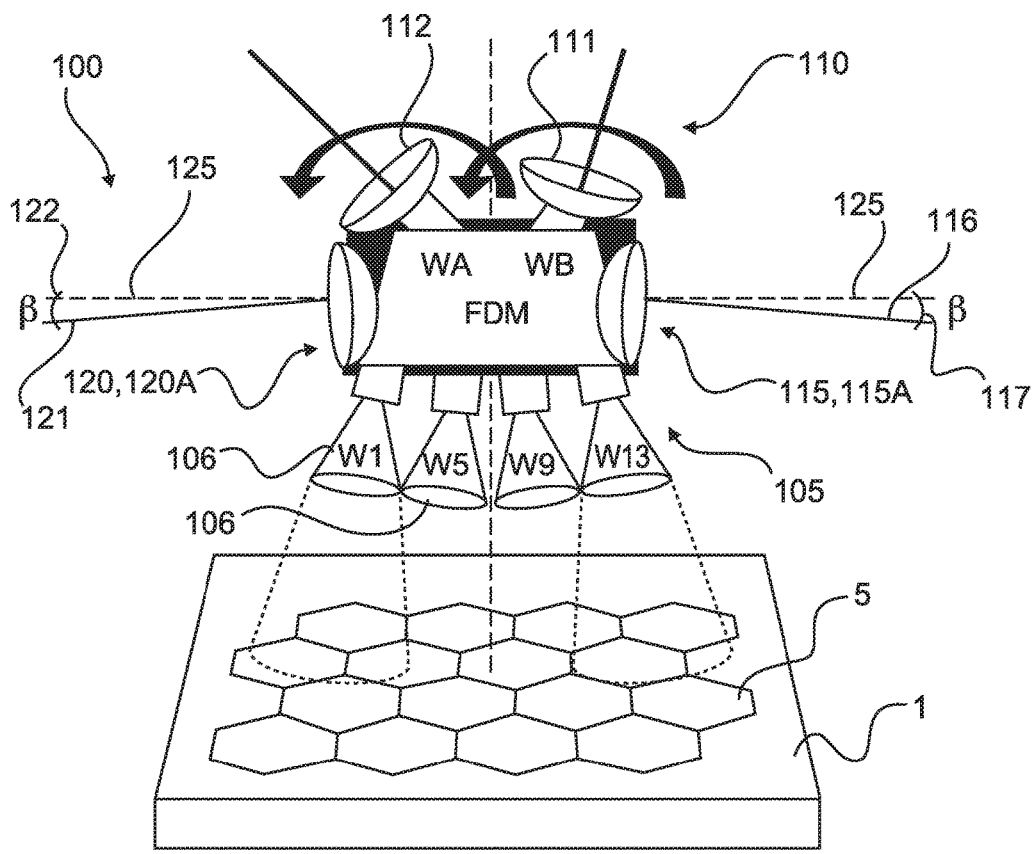
FIG. 5 a schematic representation of a communication satellite according to a further exemplary embodiment.

FIG. 5 shows a communication satellite 100, wherein the radiating and receiving arrangements of the user side interface 105, of the network side interface 110, and of the inter satellite interfaces 115, 120 are shown.

The user side interface 105 comprises multiple radiating and receiving arrangements, of which four are shown in this representation. The shown four radiating and receiving arrangements are indicated with W1, W5, W9, and W13. Each of these radiating and receiving arrangements is configured to establish a communication link to user devices that are located in communication cells 5 on the surface of the earth 1. In the present case, the communication cells are shaped like a honeycomb. Due to the number of radiating and receiving arrangements of the user side interface, the number of the communication satellites per orbital track, and the number of orbital tracks, the entire surface of the earth or a substantial part of the surface of the earth may be covered with communication cells.

The network side interface 110 comprises two radiating and receiving arrangements 111, 112. The radiating and receiving arrangements 111, 112 are each individually pivotable or slewable (the slewability is indicated by the arrows) in order to be oriented towards a remote station on the surface of the earth. The remote stations may also be referred to as a gateway and serve to transition the communication data to a terrestrial communications and data network. Thus, user devices that are scattered all over the surface of the earth may exchange data with said terrestrial communication network via the herein described communication satellites or via the satellite constellation.

Additionally, the communication satellite 100 comprises a first inter satellite interface 115 with a first radiating and receiving arrangement 115A as well as a second inter satellite interface 120 with a second radiating and receiving arrangement 120A. The radiation directions 116, 121 of the first or second radiating and receiving arrangement 115A, 120A are adjusted so that they are oriented towards the direct successor satellite or predecessor satellite. From the representation in FIG. 5 it can be derived that the radiation angle 117, 122 is spanned by the radiation direction 116, 121 of the first or second radiating and receiving arrangement 115A, 120A and the orbital track 125 or a tangent to that point of the orbital track at which the communication satellite 100 is currently located.

As a result of this structure of the communication satellite 100 with fixedly adjusted radiating and receiving arrangements of the user side interface and adjustable radiating and receiving arrangements of the network side interface, user devices from any place on earth and also mobile user devices may be connected to a remote station via the communication satellite so that a communication link is established with a terrestrial communication network.

In case a communication satellite cannot establish a connection to a remote station via the network side interface, e.g., because in its spatial cover area no remote stations are available, this communication satellite can nevertheless receive data from the communication cells and can transmit these data to the predecessor satellite or successor satellite via one of its inter satellite interfaces. Thereby, the degree of coverage of the surface of the earth with usable communication cells is increased.

Figure 6:
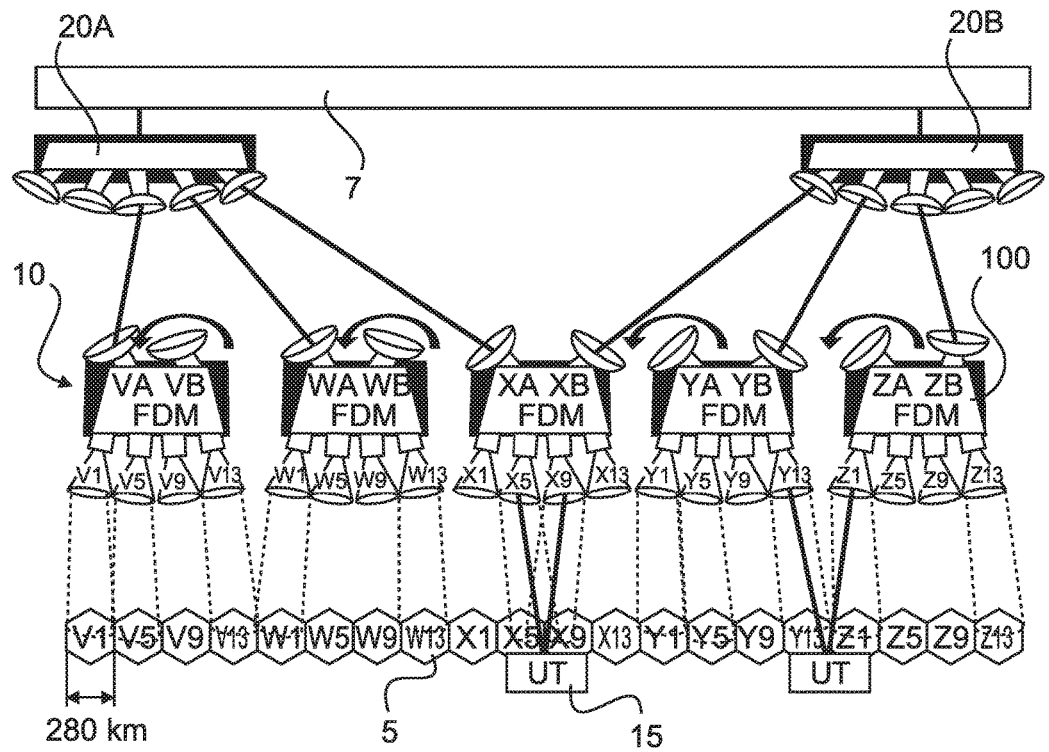
FIG. 6 a schematic representation of a satellite constellation according to a further exemplary embodiment.

FIG. 6 shows a satellite constellation 10 in which generally and schematically the connection between communication satellites 100 to a communication network 7 is shown, wherein the communication network is a terrestrial communication network, in particular. Here, five communication satellites are exemplarily show which, however, is not to be construed as a limitation.

The communication satellites cover the surface of the earth with communication cells 5 via the user side interfaces, wherein user devices 15 are located in the communication cells. For example, a communication cell may have an expansion of 280 km.

The communication satellites 100 establish a connection to the stationary remote stations 20A, 20B on the surface of the earth via the network side interface. As the satellites move around the earth along an orbital track, it is required that depending on the position of a satellite above the surface of the earth a different remote station is selected for transmitting data. The two satellites shown at the left are exclusively connected with the remote station 20A and the two satellites shown at the right are exclusively connected with the remote station 20B, whereas the middle satellite is connected with both remote stations 20A, 20B. In a transition area between the sending and receiving ranges of both remote stations 20A, 20B, the satellites are connected with both remote stations in order to handover the communication links from the remote station 20A to the remote station 20B, so that the user devices experience at most a short interruption of the effective communication link to the terrestrial communication network 7 or no interruption at all.

Figure 7:
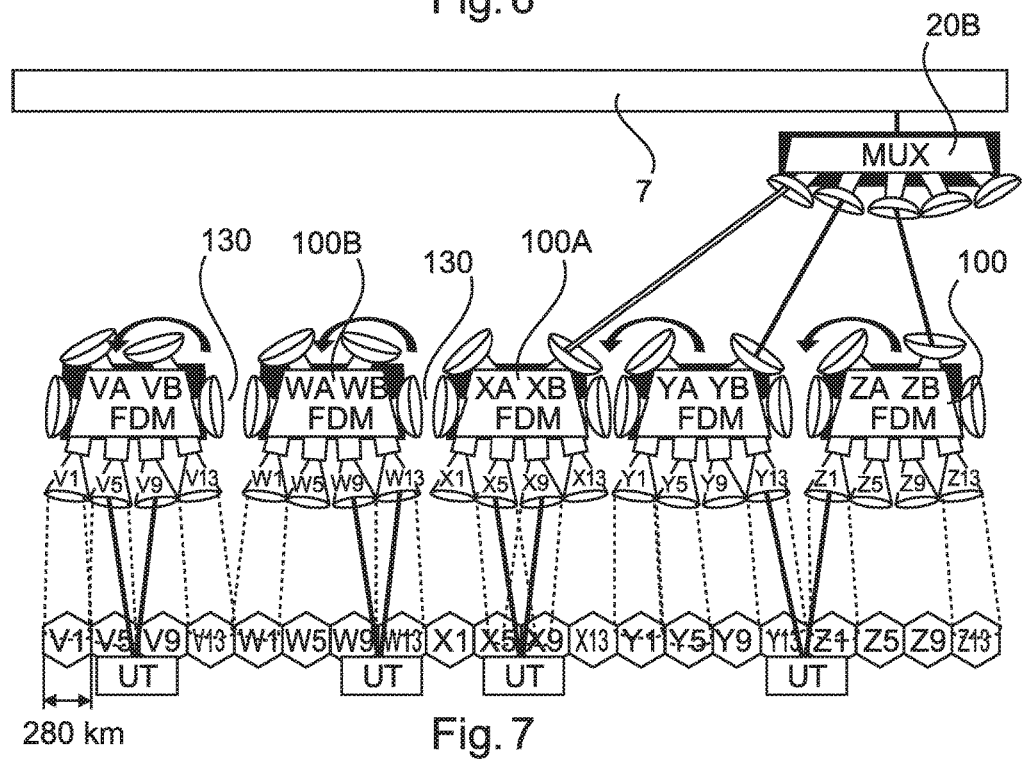
FIG. 7 a schematic representation of a satellite constellation according to a further exemplary embodiment.

FIG. 7 now shows a scenario in which at least one communication satellite (in this case the two leftmost satellites) has no direct remote station at its network side interface. However, in order for the communication cells of the two leftmost satellites to be able to establish a connection to the communication network 7, the two leftmost satellites establish an inter satellite connection 130 to their respective predecessor satellite. The leftmost satellite establishes a connection to the satellite to the right of it (to the second satellite from the left), wherein this likewise has no remote station on the network side interface and in turn establishes a connection to the middle satellite via its inter satellite interface.

In other words, the data traffic from and to the two leftmost satellites is transmitted to the remote station 20B via the middle satellite. This increases the effective coverage of the surface of the earth with usable communication satellites, so that a connection to the communication network 7 can be established even in regions that have no stationary remote stations.

However, now the bandwidth of the middle satellite is split or divided over in total three communication satellites. For this purpose, the data from the two leftmost satellites are integrated in the frequency bands of the middle satellite. This may require that a reallocation of transmission resources (in particular, frequencies, time, codes) takes place so that the signals do not interfere or overlap.

Basically, all communication satellites may use the same transmission resources due to the spatial separation. In case an inter satellite connection 130 is established, this may result in a conflict situation. This shall be elucidated exemplarily by recourse to eight frequency bands, wherein the following explanations apply in an analogous manner also to using the same time slots or codes.

In the scenario of FIG. 7, the leftmost satellite as well as the satellite second from the left may use the frequency bands 1, 2, and 3 at the user side interface, respectively, without resulting in a conflict as the two satellites are spatially separated. If now an inter satellite connection is established between these two satellites, it may result in a conflict if the same frequency bands are used for data transmission. Therefore, the frequency bands used at the inter satellite interface must be converted or transformed before they are processed or transmitted by the receiving satellite. The data incoming at the inter satellite interface at the frequency bands 1, 2, and 3 may be converted to frequency bands 4, 5, and 6 of the receiving satellite, for example, in order to prevent a conflict with the frequency bands 1, 2, and 3 of the receiving satellite. If the receiving satellite on its part transmits the data to its predecessor satellite via an inter satellite connection, a resource conversion must possibly take place there to avoid a conflict. In this example, frequency bands 7 and 8 remain. In case the available bandwidth is not sufficient to transmit all frequency bands, a resource management that limits the data traffic transmitted via an inter satellite connection may be used. In the example above, the first satellite used three frequency bands, the second satellite also used three frequency bands, and the third satellite used two frequency bands which in sum results at eight frequency bands and, in this example, also corresponds to the bandwidth of the connection to the remote station. If now each satellite has a demand for bandwidth of four frequency bands, respectively, this results in a demand of twelve frequency bands which exceeds the available number of eight frequency bands. This situation requires limiting the bandwidth (i.e., of the usable frequency bands) per satellite.

FIGS. 8 to 11 show schematic representations of the communication system of a communication satellite 100 in order to elucidate possible scenarios in a satellite constellation. For each, it is shown the user side interface, the network side interface, and the inter satellite interface with the related radiating and receiving arrangements.

It applies for all representations in the FIGS. 8 to 11 that the user side interface is shown unmodified. The user side interface serves for establishing communication links to the user devices. As user devices may be mobile and scattered or distributed all over the surface of the earth, the user side interfaces are configured to provide communication cells according to a predetermined scheme.

In contrast to the user devices, the remote stations for connecting to the terrestrial communication network are not available anywhere, in particular remote stations are typically not provided in regions that are infrastructurally not developed or hardly developed, or in regions that cannot contain such a remote station, like for example wide water areas. Nevertheless, user devices may exist in these regions. To connect these user devices to the terrestrial communication network, the data traffic from and to these user devices may be forwarded (also: transparent routing) via the satellites.

Figure 10:
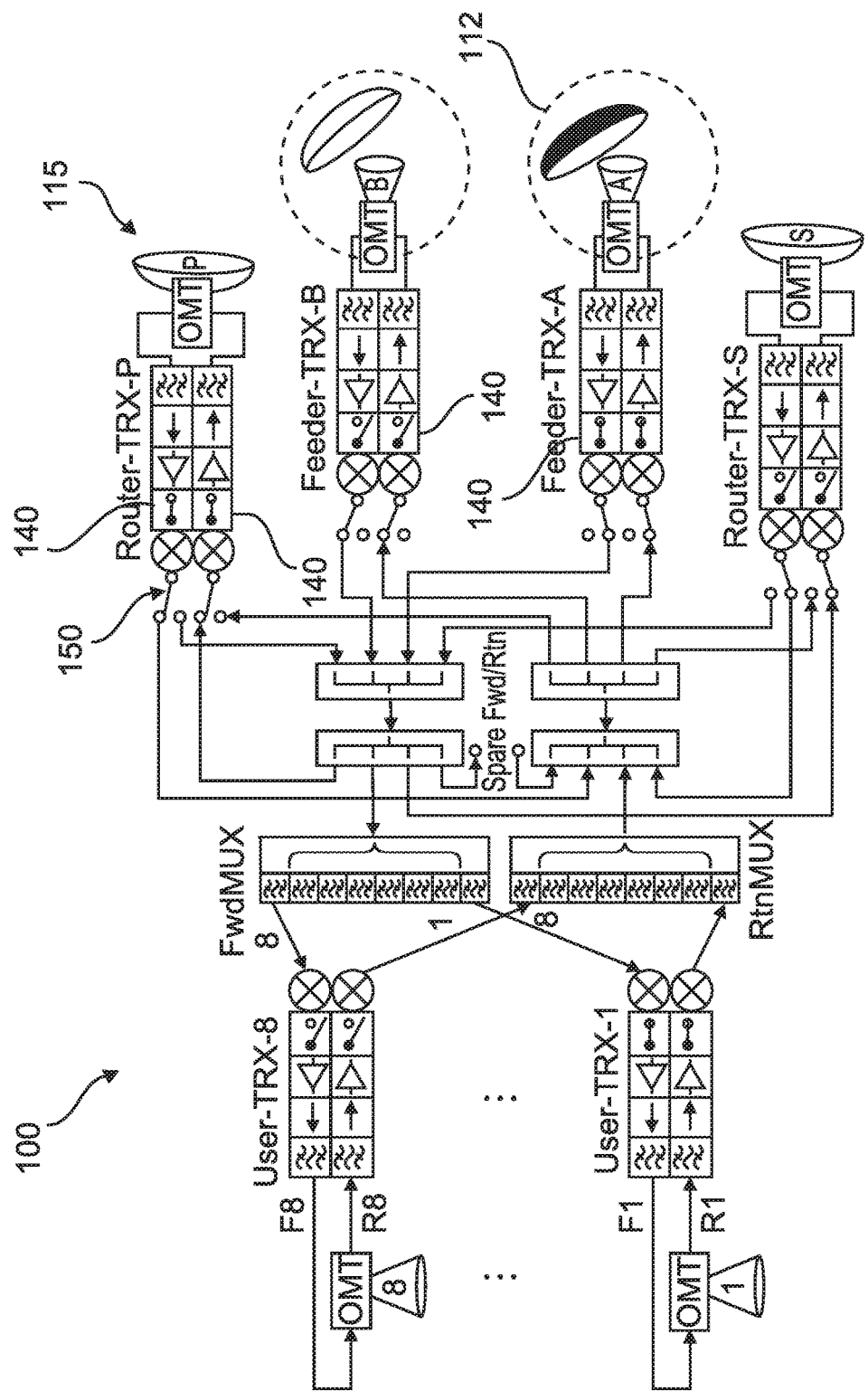
FIG. 10 a schematic representation of a communication satellite according to a further exemplary embodiment.
Figure 11:
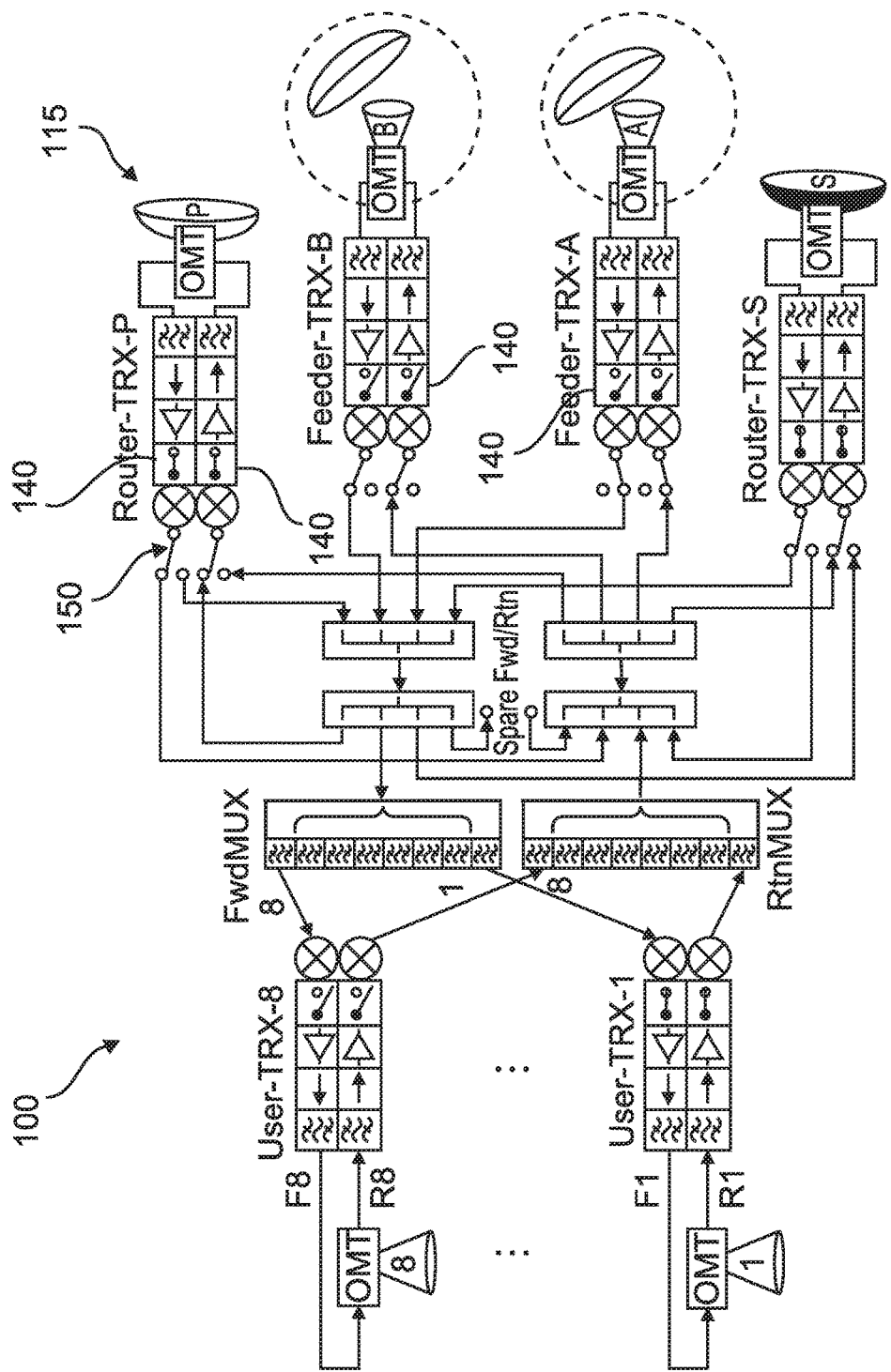
FIG. 11 a schematic representation of a communication satellite according to a further exemplary embodiment.

In order to enable this, different scenarios are conceivable in the here described satellite constellation: the communication satellite has a direct connection to an individual remote station (this may be anyone of the two possible remote stations or also to both remote stations at the same time) and no inter satellite connections to a predecessor satellite or successor satellite are active (FIG. 8); the communication satellite has no connection to a remote station and forwards the entire data traffic to the predecessor satellite or to the successor satellite via an inter satellite interface (FIG. 9); the communication satellite has a connection to a remote station and there is also one (or two) inter satellite interface(s) to the predecessor satellite and/or to the successor satellite active so that the data traffic from or to the predecessor satellite or successor satellite can be guided via the connection to the remote station (FIG. 10); the communication satellite has no connection to remote stations via the network side interface, but instead has two active inter satellite connection to the predecessor satellite as well as to the successor satellite, so that the data traffic can be forwarded from the predecessor satellite to the successor satellite (or vice versa), wherein the data traffic from the own user side interface is likewise transmitted via the inter satellite connection to the predecessor satellite or to the successor satellite, depending on whether the predecessor satellite or the successor satellite has a connection to a remote station (FIG. 11).

In all exemplary embodiments of FIGS. 8 to 11 a switch circuit 103 is provided which guides or forwards data from an incoming interface (e.g., from the user side interface or from an inter satellite interface) to an outgoing interface (e.g., to the network side interface or to the other inter satellite interface). In this example, the switch circuit 103 is configured to carry out a resource allocation so that resource conflicts at the outgoing interface are prevented.

Figure 8:
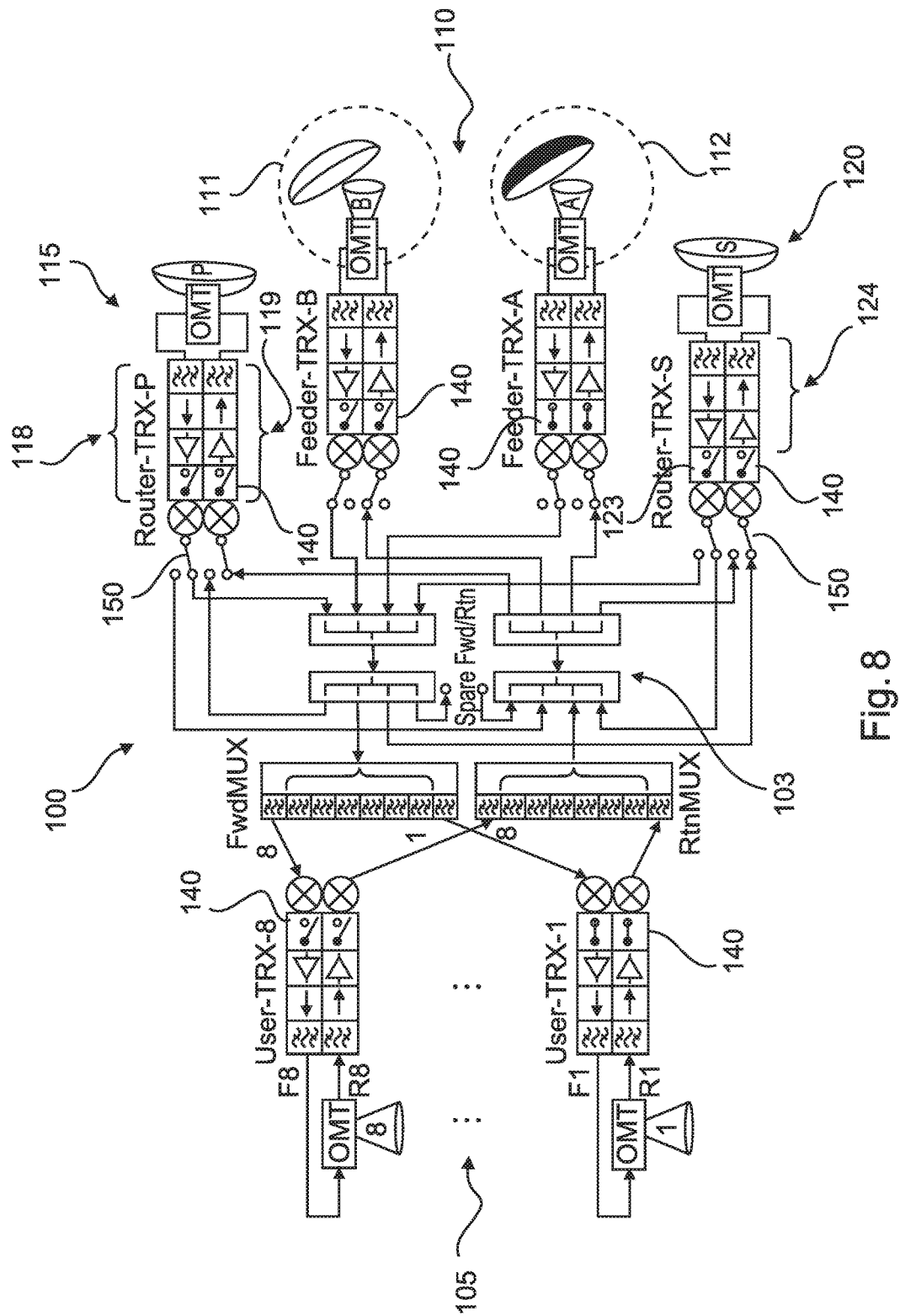
FIG. 8 a schematic representation of a communication satellite according to a further exemplary embodiment.

First, with reference to the representation in FIG. 8, the basic structure of the communication system of the communication satellite 100 shall be elucidated. The user side interface 105 comprises multiple radiating and receiving arrangements, e.g., up to eight, of which two are shown and which are indicated with User-TRX-1 and User-TRX-8. Each radiating and receiving arrangement comprises a sending path and a receiving path and the radiating and receiving arrangements are preferably structurally and functionally identical. The network side interface 110 comprises two radiating and receiving arrangements 111, 112, which are indicated with Feeder-TRX-A and Feeder-TRX-B. Each radiating and receiving arrangement comprises a sending path and a receiving path and the radiating and receiving arrangements are preferably structurally and functionally identical. Additionally, the communication satellite comprises two inter satellite interfaces 115, 120, each of which comprises a radiating and receiving arrangement which is indicated with Router-TRX-P and Router-TRX-S in order to establish the connection to the predecessor satellite (Predecessor, P) and to the successor satellite (Successor, S). Each radiating and receiving arrangement comprises a sending path 119, 124 and a receiving path 118, 123 and the radiating and receiving arrangements are preferably structurally and functionally identical.

Each sending path and each receiving path of all radiating and receiving arrangements comprises a switch 140 which may put the respective path into the active state or into the inactive state and may, thus, preset whether or not data can be transmitted/received via the respective radiating and receiving arrangement.

The radiating and receiving arrangements of the user side interface are connected to a first side (left) of the switch circuit 103 while the radiating and receiving arrangements of the network side interface are connected to a second side (right) of the switch circuit 103. The first side and the second side may also be referred to as input and output side, wherein in spite of this indication a bidirectional data transmission is possible, that is from the network side interface to the user side interface and vice versa.

Additionally, a separator (also: duplexer) 150 is provided for the radiating and receiving arrangements of the inter satellite interfaces. The reason therefor is that the inter satellite interfaces can transmit data traffic from the user side as well as from the network side. For example, if the successor satellite has no connection to a remote station, it transmits the data traffic of its user side to the current satellite so that the data traffic incoming via the inter satellite interface is fed at the user side (left) of the switch circuit 103 and is thereupon output by the current satellite either to a remote station or to the other inter satellite interface. Hence, the separator 150 defines for an inter satellite interface whether this inter satellite interface represents user side data traffic or network side data traffic so that this inter satellite interface is connected to the switch circuit 103 either left or right.

Hence, in FIG. 8, the network side radiating and receiving arrangement Feeder-TRX-A has a direct connection to a remote station and is in the active state, as can be recognized from the closed switch 140. It may also be recognized that the radiating and receiving arrangement Feeder-TRX-A is connected to the network side of the switch circuit 103 via a separator. In this constellation, data traffic can be transmitted from the user side interface 105 to the terrestrial communication network (not shown) or may be received therefrom directly via the second radiating and receiving arrangement Feeder-TRX-A 112.

The structure of the communication satellite is universally suitable for different scenarios. Thus, data traffic may be forwarded from the user side interface 105 to the network side interface 110 or to one of the two inter satellite interfaces 115, 120 (or vice versa) and data traffic may be forwarded from one or both inter satellite interfaces 115, 120 to the network side interface 110, to the user side interface 105, or to the other inter satellite interface. Hence, a user device may be connected to a remote station of the terrestrial communication network via a single satellite or via multiple satellites. This connection is transparent to the user device.

For the sake of completeness, it is noted that the communication satellite 100 may activate the first radiating and receiving arrangement 111 of the network side interface 110 additionally or alternatively to the second radiating and receiving arrangement 112, as shown in FIG. 6 for the middle satellite. In that case, data may be transmitted or received via the first remote station or via the second remote station, which increases the effectively usable bandwidth.

Figure 9:
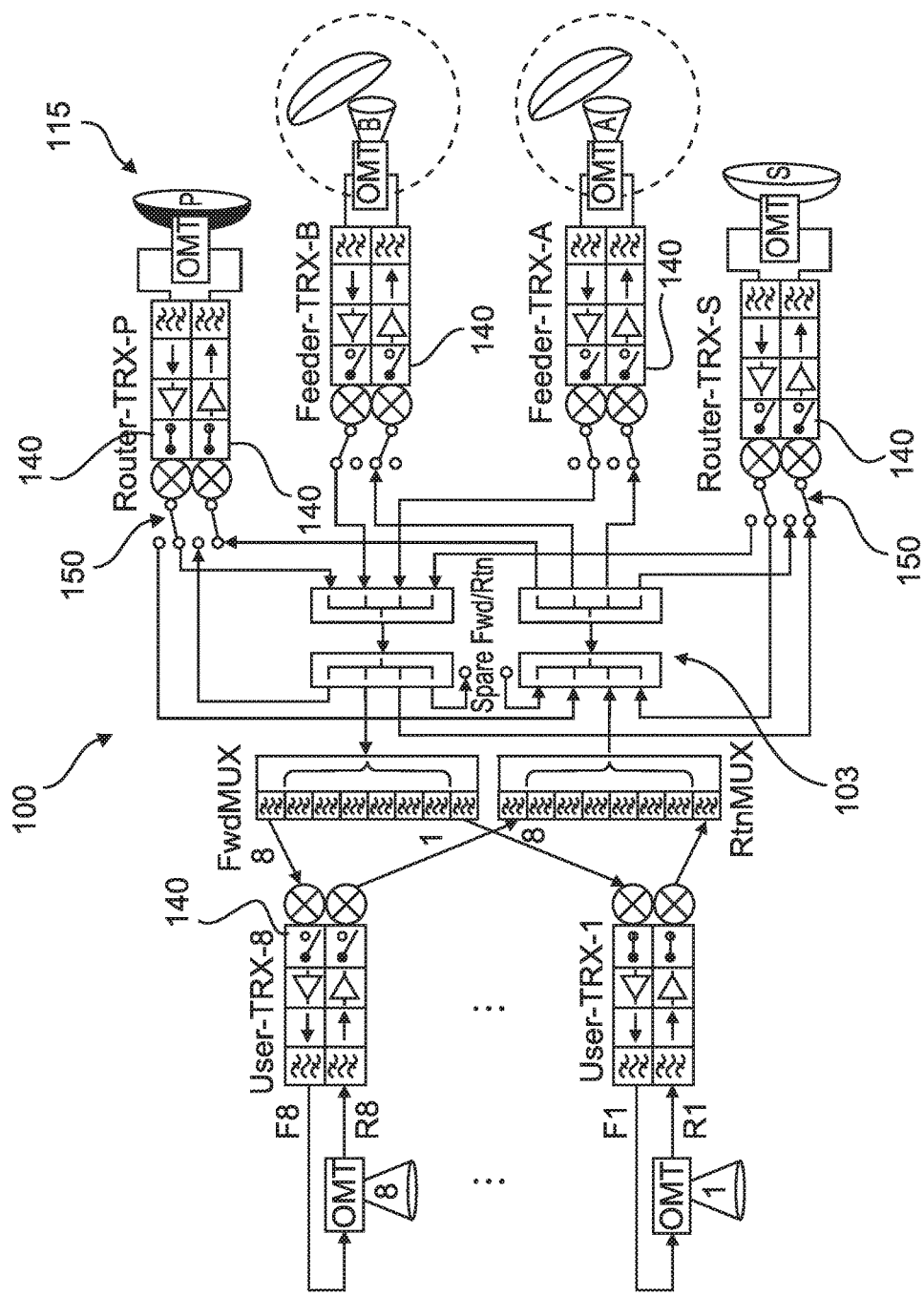
FIG. 9 a schematic representation of a communication satellite according to a further exemplary embodiment.

FIG. 9 shows the case that the current satellite has no connection to a remote station (the switches 140 of both feeders are open). The connection to the remote stations of the communication network is accomplished indirectly to the predecessor satellite via the first inter satellite interface 115. The separator 150 is toggled so that the first inter satellite interface 115 is connected to the network side (right) of the switch circuit 103. Thus, data traffic from and to the user side interface 105 is guided via the predecessor satellite.

Also in this case, an inter satellite connection to the successor satellite may be established additionally or alternatively via the inter satellite interface Router-TRX-S, so that one remote station, respectively, can be reached indirectly via the predecessor satellite and via the successor satellite. For this purpose, the separator 150 for Router-TRX-S is toggled to the network side of the switch circuit 103. In the present case, the state or position of the separator 150 has no influence to the function of Router-TRX-S because the switch 140 of Router-TRX-S is open.

FIG. 10 shows an exemplary embodiment in which the communication satellite 100 has a direct connection to a remote station via Feeder-TRX-A and additionally receives data traffic from the direct predecessor satellite via Router-TRX-P and forwards that data traffic via Feeder-TRX-A to the remote station (or vice versa). Router-TRX-P is active, the switch 140 is closed, and the separator 150 guides the data traffic to the user side (left) of the switch circuit 103.

Thus, the connection of this satellite to the remote station is used by the own user side interface as well as by the predecessor satellite. In this example, Router-TRX-S could also be active as to receive data from the successor satellite and to forward it via Feeder-TRX-A to the remote station (if the successor satellite has no direct connection to a remote station).

It is also conceivable that the data traffic from and to multiple predecessor satellites is guided via the interface Router-TRX-P, see FIG. 7. There, the data traffic from and to both left satellites is guided via the interface XA of the middle satellite. As to not guide the complete data traffic of Router-TRX-P via Feeder-TRX-A, it is conceivable that a part of this data traffic is guided to the successor satellite via Router-TRX-S. Hence, the data traffic of multiple predecessor satellites may be allocated to two or more neighboring satellites if all of these have an active and direct connection to a remote station. This may have advantages for the effective use of the available bandwidth.

FIG. 11 shows a scenario in which the current communication satellite 100 has no direct connection to a remote station and receives data traffic at the own user side interface as well as from the predecessor satellite via Router-TRX-P. Router-TRX-P is toggled to the user side (left) (connected to the user side) of the switch circuit 103 via the separator 150. The entire data traffic is guided to the network side (right) of the switch circuit 103 to Router-TRX-S.

Hence, in FIG. 11, the current communication satellite guides data traffic from the own user side interface to the successor satellite and also serves as transparent transit station (pass through station) for data traffic from and to at least one predecessor satellite.

In total, it can be seen that the user side interface is always led or connected to the user side of the switch circuit 103, that the network side interface is always led or connected to the network side of the switch circuit 103, and that each of both inter satellite interfaces can be led or connected either to the network side or to the user side. Therefrom, it follows that at least one predecessor satellite as well as at least one successor satellite can be connected either to the network side (alternatively or additionally to the network side interface) or to the user side (additionally to the own user side interface) of the switch circuit 103 of the current satellite.

Thus, a communication satellite as described herein and in the satellite constellation as described herein may improve the worldwide availability of access to a communication network because the communication satellites can transparently forward the data traffic for a user device.

The communication satellites may exchange suitable control information so that each communication satellite is informed about the state of the respective direct neighbors. This control information may indicate about a satellite whether a direct connection to a remote station exists, how much bandwidth is available in total, and how much thereof is still available. If a satellite has only an indirect connection (i.e., via at least one further satellite) to a remote station, it may be indicated how may intermediate stations (satellites) exist up to the remote station, so that each satellite may select the shortest path to a remote station if it has no own direct connection to a remote station.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 earth
5 communication cells
7 communication network
10 satellite constellation
15 user device
20A, 20B remote station
30 angular distance
30A, 30B imaginary line to the center of the earth
100 communication satellite
100A predecessor satellite
100B successor satellite
102 communication system
103 switch circuit
105 user side interface
105A receiving path
105B sending path
106 radiating and receiving arrangement
110 network side interface
110A receiving path
110B sending path
111 first radiating and receiving arrangement
112 second radiating and receiving arrangement
115 first inter satellite interface
115A radiating and receiving arrangement
116 first radiation direction
117 first radiation angle
118 receiving path
119 sending path
120 second inter satellite interface
120A radiating and receiving arrangement
121 second radiation direction
122 second radiation angle
123 receiving path
124 sending path
125 direction of movement, orbital track
130 inter satellite connection
140 switch
150 separator

The invention claimed is:

1. A communication satellite for use in a satellite constellation, the communication satellite comprising:
    a user side interface for receiving and transmitting data in a wireless manner;
    a network side interface for receiving and transmitting data in a wireless manner;
    a switch circuit for connecting the user side interface to the network side interface;
    a first inter satellite interface for wireless receiving and transmitting of data having a first radiation direction of electromagnetic waves;
    a second inter satellite interface for wireless receiving and transmitting of data having a second radiation direction of electromagnetic waves;
    wherein the first radiation direction has a first radiation angle with respect to a direction of movement of the communication satellite;
    wherein the second radiation direction has a second radiation angle with respect to the direction of movement of the communication satellite; and
    wherein an absolute value of the first radiation angle corresponds to an absolute value of the second radiation angle.

2. The communication satellite of claim 1, wherein the first inter satellite interface is arranged such that the first radiation angle is fixedly given with respect to the communication satellite and is unchangeable during operation of the communication satellite.

3. The communication satellite of claim 1, wherein the communication satellite is configured to detect presence of a remote station for the network side interface and, in case such a remote station lacks, to put the first inter satellite interface and/or the second inter satellite interface in an active state, so that an outgoing communication link to a predecessor satellite and/or to a successor satellite can be established.

4. The communication satellite of claim 3, wherein the communication satellite is configured to, in case of a missing remote station for the network side interface, transmit the data provided for a sending path of the network side interface via the first inter satellite interface or the second inter satellite interface that is in the active state.

5. The communication satellite of claim 3, wherein the switch circuit is configured to connect at least one of the user side interface and the network side interface to the inter satellite interfaces that are put in the active state.

6. The communication satellite of claim 1, wherein the communication satellite is configured to receive, via a receiving path of at least one of the inter satellite interfaces, an incoming request for establishing a communication link to a predecessor satellite or successor satellite, and to establish a communication link to the predecessor satellite or successor satellite.

7. The communication satellite of claim 6, wherein the communication satellite is configured to output data that are received via the incoming communication link of an inter satellite interface either via the network side interface or via the other inter satellite interface.

8. The communication satellite of claim 6, wherein the communication satellite is configured to convert frequency bands of the incoming communication link so that signals of the incoming communication link do not interfere with signals of an outgoing communication link of the communication satellite.

9. The communication satellite of claim 1, wherein the user side interface comprises a multitude of radiating and receiving arrangements, wherein a communication cell on the surface of the earth is assignable to each radiating and receiving arrangement.

10. The communication satellite of claim 9, wherein the radiating and receiving arrangement of the user side interface are structurally and/or functionally identical.

11. The communication satellite of claim 1, wherein the network side interface comprises a first radiating and receiving arrangement and a second radiating and receiving arrangement, which are both configured to be directed towards a stationary remote station on the surface of the earth.

12. The communication satellite of claim 11, wherein a radiation angle of the first radiating and receiving arrangement of the network side interface is changeable during operation time of the communication satellite.

13. The communication satellite of claim 11, wherein the first and second radiating and receiving arrangement of the network side interface as well as radiating and receiving arrangements of the first and second inter satellite interfaces are structurally and/or functionally identical.

14. The communication satellite of claim 1, wherein the communication satellite is configured to use differently polarized signals at the network side interface as well as at the first inter satellite interface and at the second inter satellite interface.

15. The communication satellite of claim 1, wherein the switch circuit is configured to route data from the user side interface to either the network side interface or at least one of the first and second inter satellite interfaces depending on whether the communication satellite is connected to a remote station that is connected to a terrestrial communication network.

16. A satellite constellation in an orbit, comprising:
a multitude of communication satellites;
wherein each communication satellite comprises:
a user side interface for receiving and transmitting data in a wireless manner;
a network side interface for receiving and transmitting data in a wireless manner;
a switch circuit for connecting the user side interface to the network side interface;
a first inter satellite interface for wireless receiving and transmitting of data having a first radiation direction of electromagnetic waves;
a second inter satellite interface for wireless receiving and transmitting of data having a second radiation direction of electromagnetic waves;
wherein the first radiation direction has a first radiation angle with respect to a direction of movement of the communication satellite;
wherein the second radiation direction has a second radiation angle with respect to the direction of movement of the communication satellite; and
wherein an absolute value of the first radiation angle corresponds to an absolute value of the second radiation angle
wherein a first group of communication satellites is arranged in a first orbital track in an equal angular distance with respect to each other;
wherein a second group of communication satellites is arranged in a second orbital track in an equal angular distance with respect to each other.

17. The satellite constellation of claim 16, wherein each communication satellite of the multitude of communication satellites is configured to establish a communication link via its inter satellite interfaces exclusively to the directly neighboring communication satellites in the same orbital track.

* * * * *